US008898453B2

United States Patent
Preiss et al.

(10) Patent No.: US 8,898,453 B2
(45) Date of Patent: Nov. 25, 2014

(54) AUTHENTICATION SERVER AND METHOD FOR GRANTING TOKENS

(75) Inventors: Bruno Richard Preiss, Waterloo, CA (US); Andreea Manolesco, Mississauga, CA (US)

(73) Assignee: BlackBerry Limited, Waterloo (CA)

( * ) Notice: Subject to any disclaimer, the term of this patent is extended or adjusted under 35 U.S.C. 154(b) by 591 days.

(21) Appl. No.: 12/770,060

(22) Filed: Apr. 29, 2010

(65) Prior Publication Data

US 2011/0271099 A1 Nov. 3, 2011

(51) Int. Cl.
*H04L 29/06* (2006.01)

(52) U.S. Cl.
CPC ........... *H04L 63/0807* (2013.01); *H04L 63/061* (2013.01)
USPC ........... 713/155; 713/150; 713/156; 713/169; 726/4; 726/5; 726/7; 726/9; 726/10; 726/18; 726/19

(58) Field of Classification Search
CPC ............................. H04L 63/08; H04L 63/0807
USPC .......... 713/150, 155–156, 169; 380/229, 232, 380/247–250; 705/67; 709/225–226, 229; 726/4–5, 7, 9–10, 18–19
See application file for complete search history.

(56) References Cited

U.S. PATENT DOCUMENTS

| 6,643,701 | B1 * | 11/2003 | Aziz et al. ..................... 709/227 |
| 7,748,028 | B2 * | 6/2010 | Sato et al. ........................... 726/5 |
| 7,813,511 | B2 * | 10/2010 | Leung et al. .................. 380/281 |
| 7,853,995 | B2 * | 12/2010 | Chow et al. ...................... 726/10 |
| 7,877,794 | B2 * | 1/2011 | Fujiwara et al. ................. 726/10 |
| 8,010,783 | B1 * | 8/2011 | Cahill ............................ 713/155 |
| 2002/0143922 | A1 * | 10/2002 | Tanimoto ....................... 709/223 |
| 2006/0053300 | A1 * | 3/2006 | Noguchi ........................ 713/182 |
| 2007/0266246 | A1 * | 11/2007 | Lee et al. ....................... 713/168 |

(Continued)

FOREIGN PATENT DOCUMENTS

| EP | 1613017 A1 | 1/2006 |
| EP | 2384040 A1 | 2/2011 |
| WO | 2008064589 A1 | 6/2008 |

OTHER PUBLICATIONS

R. Droms et al., Authentication for DHCP Messages, Jun. 2001, Network Working Group, pp. 1-18.*

(Continued)

*Primary Examiner* — Bradley Holder
*Assistant Examiner* — Fahimeh Mohammadi
(74) *Attorney, Agent, or Firm* — Ridout & Maybee LLP

(57) ABSTRACT

An authentication server and method are provided for generating tokens for use by a mobile electronic device for accessing a service. Communications between the device and the authentication server are through a relay. A memory stores a secret shared with a service server from which the service is provided. A processor is configured to generate the token using the shared secret and based on a reliance on the relay to ensure that the device has authorization to access the service. One or more computer readable medium having computer readable instructions stored thereon that cause the device to obtain proof of authorization to access the service is also provided. The instructions implement a method comprising: outputting via a wireless connection to a relay a request addressed to an authentication server for a token and receiving the token from the authentication server via the relay.

15 Claims, 7 Drawing Sheets

(56) References Cited

U.S. PATENT DOCUMENTS

| | | | | |
|---|---|---|---|---|
| 2008/0104687 | A1* | 5/2008 | Fujiwara et al. | 726/10 |
| 2009/0094684 | A1* | 4/2009 | Chinnusamy et al. | 726/4 |
| 2009/0165095 | A1* | 6/2009 | Ishikawa et al. | 726/4 |
| 2009/0187986 | A1* | 7/2009 | Ozeki | 726/21 |
| 2010/0332832 | A1* | 12/2010 | Wu et al. | 713/169 |
| 2011/0271099 | A1 | 11/2011 | Preiss et al. | |

OTHER PUBLICATIONS

Steffen Hallsteinsen, Using the mobile phone as a security token for unified authentication, Aug. 25-31, 2007, IEEE, pp. 1-6.*

Vipin M. et al., A Multi Way Tree for Token Based Authentication, Dec. 12-14, 2008, IEEE, vol. 3, pp. 1-4.*

Etsuko Suzuki, A Design of Authentication System for Distributed Education, May 31-Jun. 2, 2004, IEEE, pp. 66-71.*

Needham, Roger M. and Schroeder, Michael D., "Using Encryption for Authentication in Large Networks of Computers", Operating Systems, Communications of the Association for Computing Machinery, vol. 21 No. 12, Dec. 1978, p. 993-999.

Extended European Search Report issued Jan. 12, 2011 on related European Patent Application No. 10161533.4; 4 pages.

European Patent Office, "Extended European Search Report" for European Patent Application No. 12160877.2, dated Oct. 10, 2012, Germany.

Bao, Lichun et al., "Location Authentication Methods for Wireless Network Access Control", Performance, Computing and Communications Conference 2008, Dec. 7, 2008, United States of America.

Jaros, David et al., "New Location-based Authentication Techniques in the Access Management", Wireless and Mobile Communications, 2010 6th International Conference, Sep. 20, 2010, United States of America.

Wong, Chapman—Canadian Intellectual Property Office, "Examiner's Requisition" for Canadian Patent Application No. 2,734,481 dated Apr. 18, 2013, Canada.

* cited by examiner

AUTHENTICATION SERVER AND METHOD FOR GRANTING TOKENS

TECHNICAL FIELD

The present disclosure relates generally to an authentication server and method for granting tokens to a mobile electronic device for accessing a service on a service server.

BACKGROUND

To access some services offered by service providers, mobile communications devices are required to authenticate. There are different existing protocols and architectures for authentication of mobile communications device. One such protocol is Kerberos, in which a client obtains a ticket from an authentication server and then uses that ticket to access a service on server.

Many mobile communications devices today are able to browse the Internet using web browsers. In some systems, mobile communications devices communicate with origin web servers directly. In other systems devices communicate with origin web servers through a browsing proxy.

BRIEF DESCRIPTION OF THE DRAWINGS

Like reference numerals are used in the drawings to denote like elements and features.

DETAILED DESCRIPTION OF EXAMPLE EMBODIMENTS

In accordance with one aspect, there is provided an authentication server comprising: a receiver for receiving communications from a relay; a transmitter for transmitting communications to the relay; a memory having stored thereon a secret shared with a service server from which a service is provided; and a processor configured, in response to a request originating from a mobile electronic device received from the relay at the receiver, to generate a token based on a reliance on the relay to ensure that the mobile electronic device has authorization to access the service and the processor configured to cause the transmitter to transmit the token to the mobile electronic device through the relay, the token generated using the shared secret and the token including an indication that the mobile electronic device is authorized to access the service.

In accordance with another aspect, there is provided a method of issuing a token for use by a mobile electronic device for authorization to access a service provided from a service server, the method comprising: receiving at an authentication server a request for the token from the mobile electronic device through a relay; generating the token based on a reliance on the relay to ensure that the mobile electronic device is authorized to access the service; and transmitting the token to the mobile electronic device through the relay.

In accordance with another aspect, there is provided one or more computer readable medium having computer readable instructions stored thereon that when executed by a processor on a mobile electronic device cause the mobile electronic device to obtain proof of authorization to access a service provided from a service server by a method comprising: outputting to a relay a request addressed to an authentication server for a token, the token including an indication that the mobile electronic device is authorized to access the service; and receiving the token from the authentication server via the relay.

Embodiments of the present application are not limited to any particular operating system, mobile electronic device architecture, server architecture, or computer programming language. It is to be understood that alternate embodiments are feasible.

Figure 1:
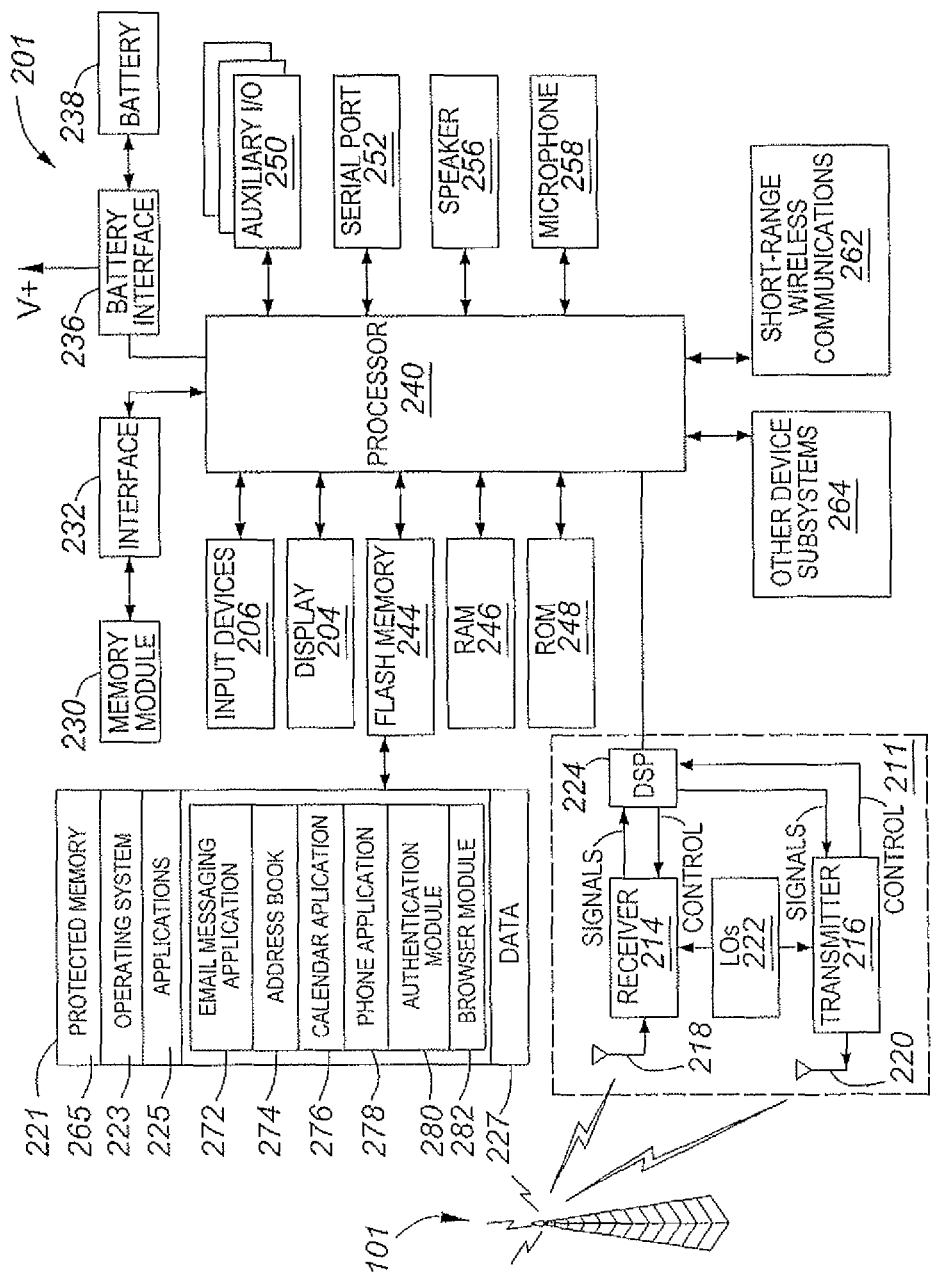
FIG. 1 is a block diagram illustrating a mobile electronic device in accordance with one example embodiment of the present disclosure.

Reference is now made to FIG. 1 which illustrates an exemplary embodiment of the mobile electronic device 201 in which example embodiments described in the present disclosure can be applied. The mobile electronic device 201 is a two-way communication device having data and voice communication capabilities, and the capability to communicate with other computer systems, for example, via the Internet. Depending on the functionality provided by the mobile electronic device 201, in various embodiments the device 201 may be a multiple-mode communication device configured for both data and voice communication, a smartphone, a mobile telephone or a PDA (personal digital assistant) enabled for wireless communication, or a computer system with a wireless modem.

The mobile electronic device 201 includes a rigid case (not shown) housing the components of the device 201. The internal components of the device 201 are constructed on a printed circuit board (PCB). The mobile electronic device 201 includes a controller comprising at least one processor 240 (such as a microprocessor) which controls the overall operation of the device 201. The processor 240 interacts with device subsystems such as a wireless communication subsystem 211 (sometimes referred to as a radio layer) for exchanging radio frequency signals with the wireless network 101 to perform communication functions. The processor 240 interacts with additional device subsystems including a display screen 204 such as a liquid crystal display (LCD) screen, input devices 206 such as a keyboard and control buttons, flash memory 244, random access memory (RAM) 246, read only memory (ROM) 248, auxiliary input/output (I/O) subsystems 250, data port 252 such as serial data port, such as a Universal Serial Bus (USB) data port, speaker 256, microphone 258, short-range communication subsystem 262, and other device subsystems generally designated as 264. Some of the subsystems shown in FIG. 1 perform communication-related functions, whereas other subsystems may provide "resident" or on-device functions.

The device 201 may comprise a touchscreen display in some embodiments. The touchscreen display may be constructed using a touch-sensitive input surface connected to an electronic controller and which overlays the display screen 204. The touch-sensitive overlay and the electronic controller provide a touch-sensitive input device and the processor 240 interacts with the touch-sensitive overlay via the electronic controller.

The communication subsystem 211 includes a receiver 214, a transmitter 216, and associated components, such as one or more antenna elements 218 and 220, local oscillators (LOs) 222, and a processing module such as a digital signal processor (DSP) 224. The antenna elements 218 and 220 may be embedded or internal to the mobile electronic device 201 and a single antenna may be shared by both receiver and transmitter, as is known in the art. As will be apparent to those skilled in the field of communication, the particular design of the wireless communication subsystem 211 depends on the wireless network 101 in which mobile electronic device 201 is intended to operate.

The mobile electronic device 201 may communicate with any one of a plurality of fixed transceiver base stations 108 of the wireless network 101 within its geographic coverage area. The mobile electronic device 201 may send and receive communication signals over the wireless network 101 after the required network registration or activation procedures have been completed. Signals received by the antenna 218 through the wireless network 101 are input to the receiver 214, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 224. In a similar manner, signals to be transmitted are processed, including modulation and encoding, for example, by the DSP 224. These DSP-processed signals are output to the transmitter 216 for digital-to-analog (D/A) conversion, frequency up conversion, filtering, amplification, and transmission to the wireless network 101 via the antenna 220. The DSP 224 not only processes communication signals, but may also provide for receiver and transmitter control. For example, the gains applied to communication signals in the receiver 214 and the transmitter 216 may be adaptively controlled through automatic gain control algorithms implemented in the DSP 224.

The processor 240 operates under stored program control and executes software modules 221 stored in memory such as persistent memory, for example, in the flash memory 244. As illustrated in FIG. 1, the software modules 221 comprise operating system software 223, software applications 225 comprising an email messaging application 272 (also referred to as an email client 272), a personal address book 274, a calendar application 276, a phone application 278, an authentication module 280 and a browsing module 282. Example embodiments of the authentication module 280 will be discussed in detail later herein. It is recognized that the authentication module 280 and its various components as described herein can form a discrete module running on the device 201, or the functions of the authentication module 280 can be distributed on the device 201 as separate modules or integrated within other existing modules as desired. Such discrete or distributed implementations all fall within the embodiments of the authentication module 280 as described herein. In some embodiments, the authentication module is configured to obtain tokens from an authentication server for accessing a browsing proxy. In other implementations the token is for accessing a server containing data files. In still other implementations, the token is for accessing a service, such as banking services. Once obtained, a token can be used by the browsing module 282 to access the browsing proxy directly and enable the user of the mobile electronic device to access the Internet.

The software applications 225 also may include a range of applications, including, for example, a notepad application, Internet browser application, voice communication (i.e. telephony) application, mapping application, or a media player application, or any combination thereof. Each of the software applications 225 may include layout information defining the placement of particular fields and graphic elements (e.g. text fields, input fields, icons, etc.) in the user interface (i.e. the display screen 204) according to the application.

Those skilled in the art will appreciate that the software modules 221 or parts thereof may be temporarily loaded into volatile memory such as the RAM 246. The RAM 246 is used for storing runtime data variables and other types of data or information, as will be apparent to those skilled in the art. Although specific functions are described for various types of memory, this is merely one example, and those skilled in the art will appreciate that a different assignment of functions to types of memory could also be used.

In some embodiments, the auxiliary I/O subsystems 250 may comprise an external communication link or interface, for example, an Ethernet connection. The mobile electronic device 201 may comprise other wireless communication interfaces for communicating with other types of wireless networks, for example, a wireless network such as an orthogonal frequency division multiplexed (OFDM) network or a GPS (Global Positioning System) subsystem comprising a GPS receiver or transceiver for communicating with a GPS satellite network (not shown). The auxiliary I/O subsystems 250 may comprise a pointing or navigational input device such as a clickable trackball or scroll wheel or thumbwheel, or a vibrator for providing vibratory notifications in response to various events on the device 201 such as receipt of an electronic message or incoming phone call, or for other purposes such as haptic feedback (touch feedback).

In some embodiments, the mobile electronic device 201 also includes a removable memory card or module 230 (typically comprising flash memory) and a memory card interface 232. Network access is typically associated with a subscriber or user of the mobile electronic device 201 via the memory card 230, which may be a Subscriber Identity Module (SIM) card for use in a GSM network or other type of memory card for use in the relevant wireless network type. The memory card 230 is inserted in or connected to the memory card interface 232 of the mobile electronic device 201 in order to operate in conjunction with the wireless network 101.

The mobile electronic device 201 also stores other data 227 in an erasable persistent memory, which in one example embodiment is the flash memory 244. In various embodiments, the data 227 includes service data comprising information required by the mobile electronic device 201 to establish and maintain communication with the wireless network 101. The data 227 may also include user application data such as email messages, address book and contact information, calendar and schedule information, notepad documents, image files, and other commonly stored user information stored on the mobile electronic device 201 by its user, and other data. The data 227 stored in the persistent memory (e.g. flash memory 244) of the mobile electronic device 201 may be organized, at least partially, into a number of databases each containing data items of the same data type or associated with the same application. For example, email messages, contact records, and task items may be stored in individual databases within the device memory.

The mobile electronic device 201 also includes a battery 238 as a power source, which is typically one or more rechargeable batteries that may be charged, for example, through charging circuitry coupled to a battery interface such as the serial data port 252. The battery 238 provides electrical power to at least some of the electrical circuitry in the mobile electronic device 201, and the battery interface 236 provides a mechanical and electrical connection for the battery 238. The battery interface 236 is coupled to a regulator (not shown) which provides power V+ to the circuitry of the mobile electronic device 201.

The short-range communication subsystem 262 is an additional optional component which provides for communication between the mobile electronic device 201 and different systems or devices, which need not necessarily be similar devices. For example, the subsystem 262 may include an infrared device and associated circuits and components, or a wireless bus protocol compliant communication mechanism such as a Bluetooth® communication module to provide for communication with similarly-enabled systems and devices.

A predetermined set of applications that control basic device operations, including data and voice communication applications will normally be installed on the mobile electronic device 201 during or after manufacture. Additional applications and/or upgrades to the operating system 221 or software applications 225 may also be loaded onto the mobile electronic device 201 through the wireless network 101, the auxiliary I/O subsystem 250, the serial port 252, the short-range communication subsystem 262, or other suitable subsystem 264. The downloaded programs or code modules may be permanently installed, for example, written into the program memory (i.e. the flash memory 244), or written into and executed from the RAM 246 for execution by the processor 240 at runtime. Such flexibility in application installation increases the functionality of the mobile electronic device 201 and may provide enhanced on-device functions, communication-related functions, or both. For example, secure communication applications may enable electronic commerce functions and other such financial transactions to be performed using the mobile electronic device 201.

The mobile electronic device 201 may provide two principal modes of communication: a data communication mode and a voice communication mode. In the data communication mode, a received data signal such as a text message, an email message, or Web page download will be processed by the communication subsystem 211 and input to the processor 240 for further processing. For example, a downloaded Web page may be further processed by a browser application or an email message may be processed by the email messaging application and output to the display 204. A user of the mobile electronic device 201 may also compose data items, such as email messages, for example, using the input devices in conjunction with the display screen 204. These composed items may be transmitted through the communication subsystem 211 over the wireless network 101.

In the voice communication mode, the mobile electronic device 201 provides telephony functions and operates as a typical cellular phone. The overall operation is similar, except that the received signals are output to the speaker 256 and signals for transmission are generated by a transducer such as the microphone 258. The telephony functions are provided by a combination of software/firmware (i.e., the phone application 278) and hardware (i.e., the microphone 258, the speaker 256 and input devices). Alternative voice or audio I/O subsystems, such as a voice message recording subsystem, may also be implemented on the mobile electronic device 201. Although voice or audio signal output is typically accomplished primarily through the speaker 256, the display screen 204 may also be used to provide an indication of the identity of a calling party, duration of a voice call, or other voice call related information.

The phone application 278 can be split into multiple applications or sub-modules, for example one or more user phone modules and a call control module. The user phone modules provide a variety of telephony features through a user interface, while the call control module provides access to common telephony functions desired by the user phone modules, such that telephony requests from phone modules can be coordinated and so that the user phone modules do not need to each provide instructions understood by the wireless communications subsystem 211. The call control function typically makes telephony features available to user phone modules through an application programming interface (API). It is to be recognized that all or part of the phone application 278 features or functions could be provided through the operating system or otherwise distributed in the device 201, while continuing to fall within the term phone application 278.

An authentication system and method is provided for authenticating a mobile electronic device attempting to access a service, such as, a browsing proxy in order to browse the internet. The approach uses an authentication and authorization function to authenticate and authorize access to the service, keeping the authentication and authorization function separate from the token granting function. The approach uses a Kerberos-like authentication protocol.

Figure 2:
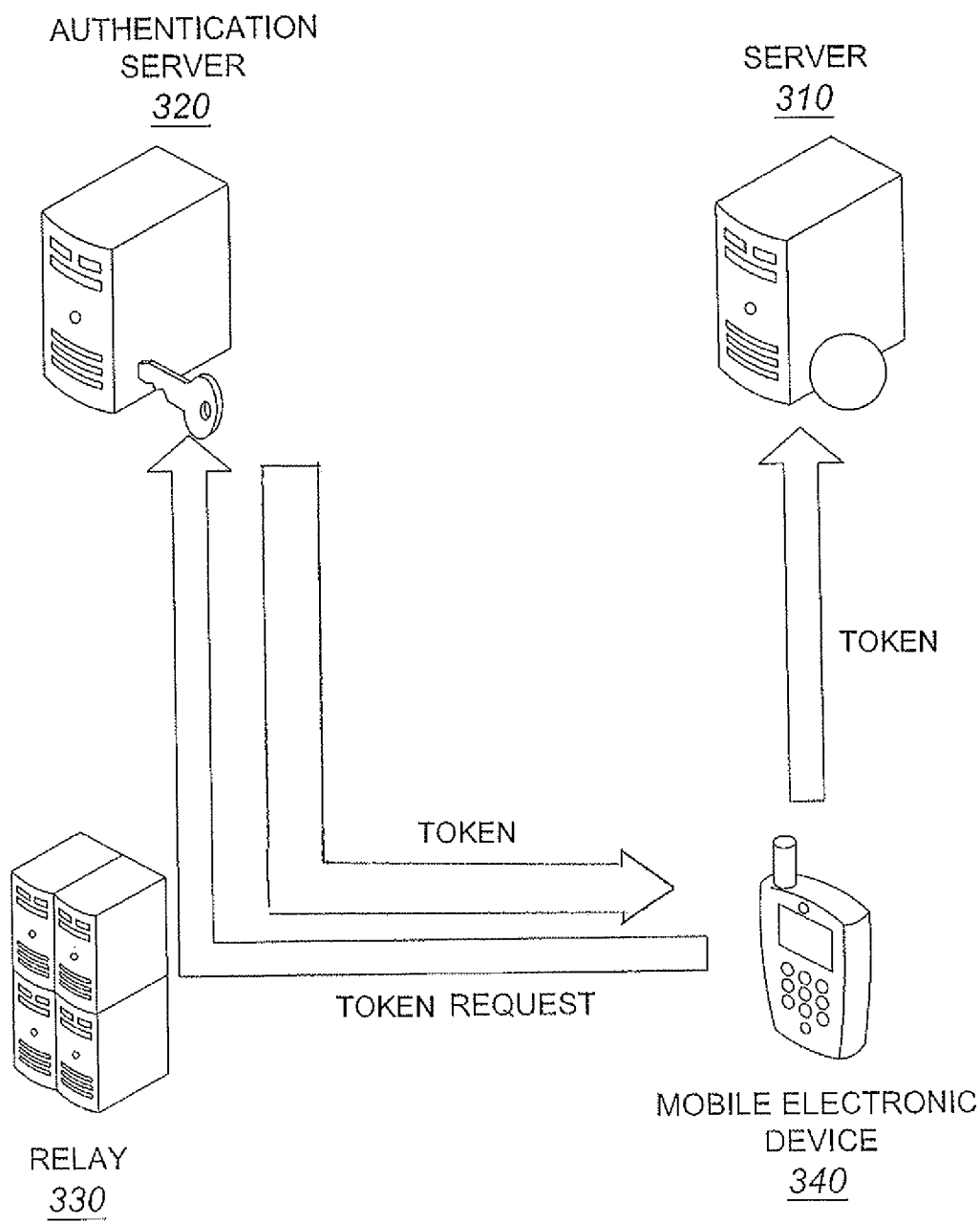
FIG. 2 is a diagram of a system in accordance with one example embodiment of the present disclosure.

Referring now to FIG. 2, to support authorization and authentication for the service on a service server 310, an authentication server 320 is attached to a relay 330. The mobile electronic devices 340 (only one shown) are granted access to the service on the service server 310 by means of a relay-based authentication and authorization mechanism. It is to be understood that mobile electronic devices 340 referred to with reference to FIG. 2 include but are not limited to mobile electronic device 201 described above with reference to FIG. 1. An exemplary authentication mechanism is a user identification and password mechanism, whereby the mobile electronic device 340 provides the relay 330 with a user identification and password unique to the mobile electronic device 340 or a device PIN in order to access the relay 330. In embodiments, the mobile device 340 registers and thus authenticates itself with the relay prior to outputting the request for the token to the relay. An exemplary authorization mechanism is one in which the relay determines the services that a device may use on the basis of information provisioned in a service provisioning database in the relay.

The relay 330 is configured to authorize a device to access to the authentication server 320 only if that device is authorized to access the service on the service server 310.

In some embodiments, the service server 310 is a browsing proxy. The authentication server and the browsing proxy are configured with a shared secret, such as, but not limited to a password.

In some embodiments, the authentication server and the service server are configured with the shared secret during setup. In some embodiments, the shared secret is sent to each of the authentication server and the service server by a third entity. In other embodiments, the shared secret is communicated from the authentication server to the service or vice versa. It is not necessary for the authentication server and service server to communicate with each other after the shared secret is exchanged.

Figure 3:
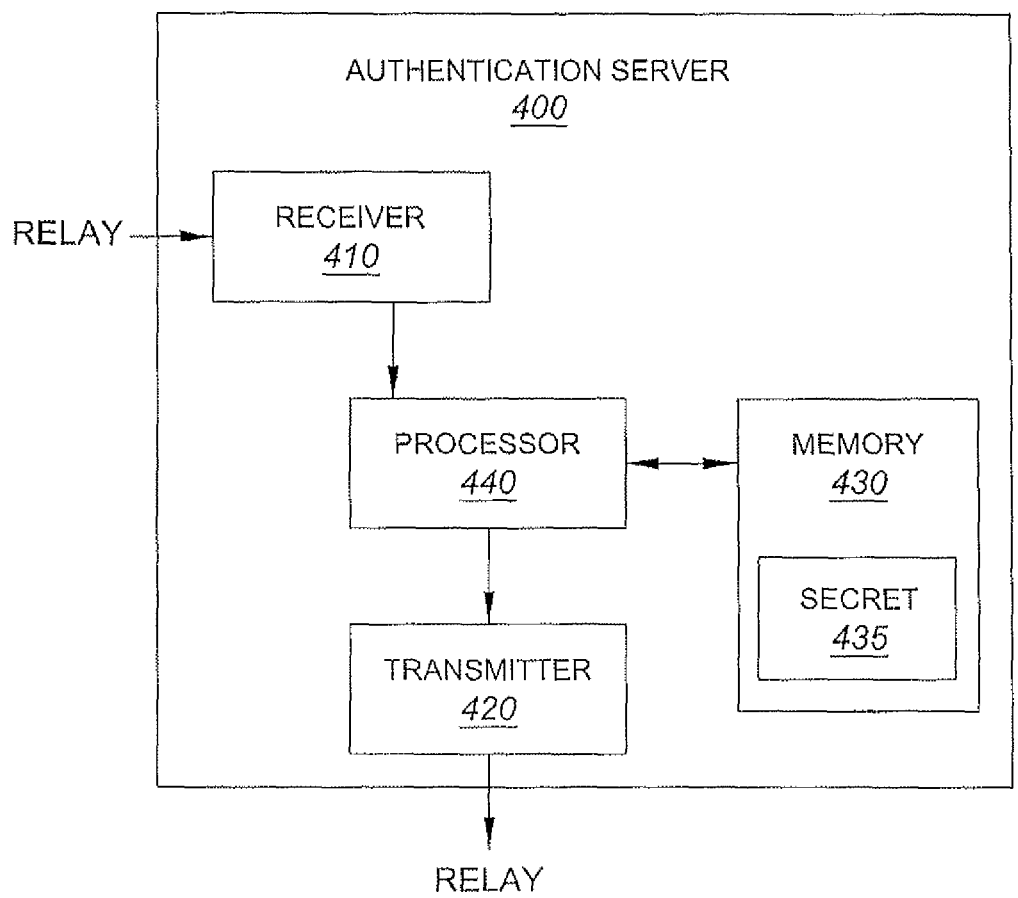
FIG. 3 is a block diagram of an authentication server in accordance with one example embodiment of the present disclosure.

An exemplary embodiment of an authentication server will now be described with reference to FIG. 3. The authentication server 400 comprises a receiver 410, a transmitter 420, a memory 430 and a processor 440. The receiver 410 is for receiving communications from a relay. The transmitter 420 is for transmitting communications to the relay. The memory 430 stores a secret 435 shared with a service server from which a service is provided. The processor 440 is configured to generate a token using the shared secret and based on a reliance on the relay to ensure that the mobile electronic device has authorization to access the service. The processor 440 generates the token in response to a request originating from a mobile electronic device received from the relay at the receiver 410. The processor 440 is also configured to cause the transmitter 420 to transmit the token to the mobile electronic device through the relay. The token includes an indication that the mobile electronic device is authorized to access the service.

In some embodiments of the authentication server 400, the processor 440 is configured to generate the token based on a reliance on the relay to authenticate the mobile electronic device.

In some embodiments, the authentication server 400 is connected to the relay by a direct connection and the request is received over the direct connection and the token is transmitted over the direct connection.

In some embodiments, the processor 440 is further configured to verify that a device identifier carried in the request matches a source address of a message containing the request. The mobile electronic device includes its device identifier in the request for the token. The request for the token is sent as part of a message that includes information such as the source address that includes the device identifier. The relay verifies that the source address is authentic. The processor 440 at the authentication server extracts the device identifier from the source address in the message and compares it to the device identifier in the request.

In some embodiments, the processor 440 is further configured to obtain a device identifier for the mobile electronic device from the request and include the device identifier in the token.

In some embodiments, the processor 440 is configured to include an expiry threshold in the token. Non-limiting examples of the expiry threshold include a time period after which the token expires and a number of times the mobile electronic device can access the service server using the same token, after which the token expires.

In some embodiments, the processor 440 is configured to generate the token authorizing the mobile electronic device to access a browsing proxy. In some embodiments, the processor 440 is further configured to negotiate a session key with the mobile electronic device through the relay, the session key being for encrypting and decrypting communications between the mobile electronic device and the authentication server.

Figure 4:
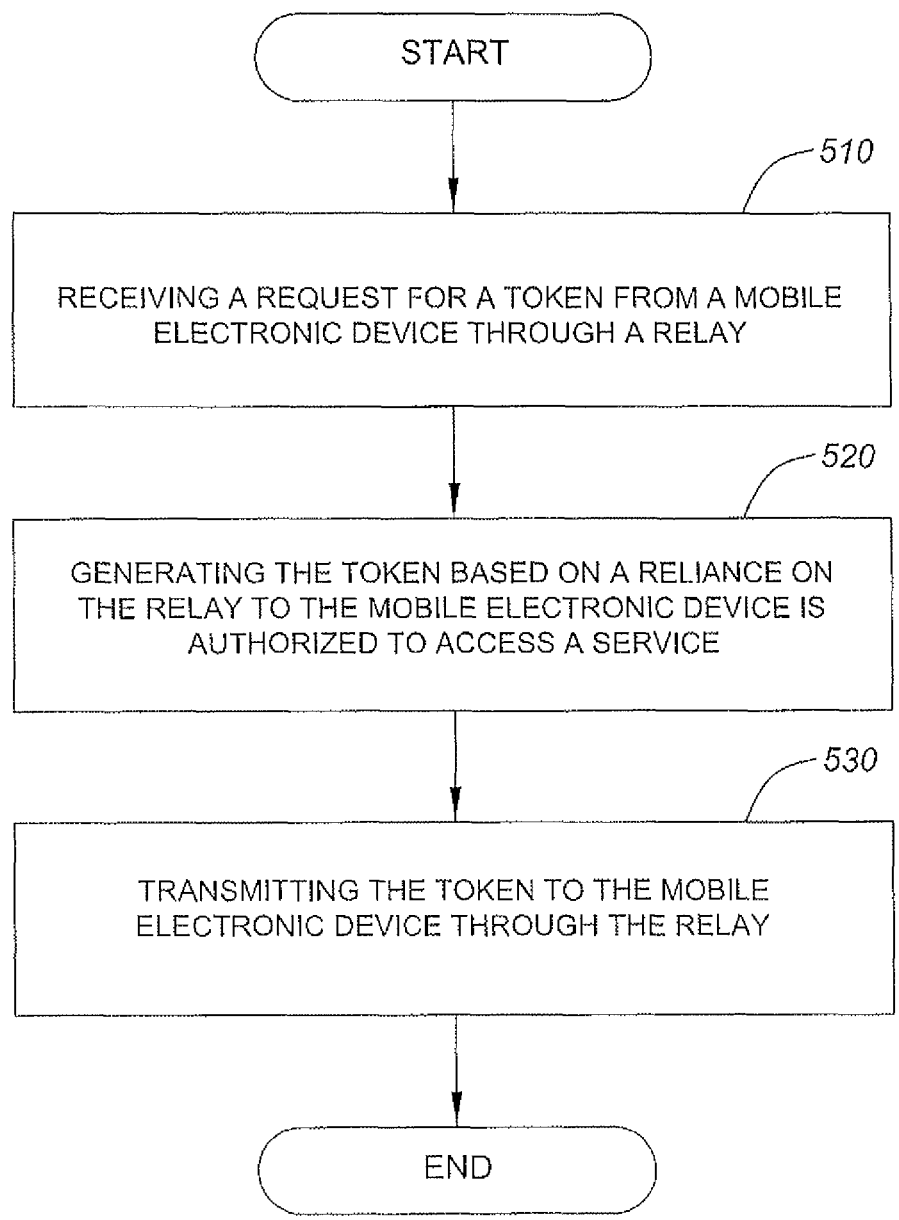
FIG. 4 is a flow chart of a method in accordance with one example embodiment of the present disclosure.

An exemplary method of issuing a token for use by a mobile electronic device authorization to access a service provided from a service server directly will now be described with reference to FIG. 4. The method comprises: receiving at an authentication server a request for the token from the mobile electronic device through a relay 510; generating the token based on a reliance on the relay to ensure that the mobile electronic device is authorized to access the service 520; and transmitting the token to the mobile electronic device through the relay 530.

In some embodiments, generating the token is further based on a reliance on the relay to authenticate the mobile electronic device.

In some embodiments, the method further comprises: receiving a request from the mobile electronic device through the relay to negotiate a session key to be used for communications between the mobile electronic device and the authentication server in providing the token; negotiating the session key with the mobile electronic device through the relay; and using the session key for transmitting the token. In some embodiments, these actions related to the negotiation of the session key take place before the request for the token is sent by the mobile electronic device.

In some embodiments, the method further comprises verifying that a device identifier carried in the request matches a source address of an encrypted message containing the request.

In some embodiments, the method further comprises obtaining a device identifier for the mobile electronic device from the request and including the device identifier in the token.

In some embodiments, generating the token comprises generating a token for accessing a browsing proxy. In some embodiments, the mobile electronic device is authorized to access the origin web servers directly.

To minimize any additional bandwidth requirements and network latency introduced by the authentication procedure, in some embodiments, the authentication token is refreshed automatically so that the service server 310 hardly ever responds indicating that the token has expired (causing a delay loading the web page). In some embodiments, the refresh mechanism is randomized so that every mobile electronic device in the network is not requesting a token refresh from the relay at the same time.

Figure 5:
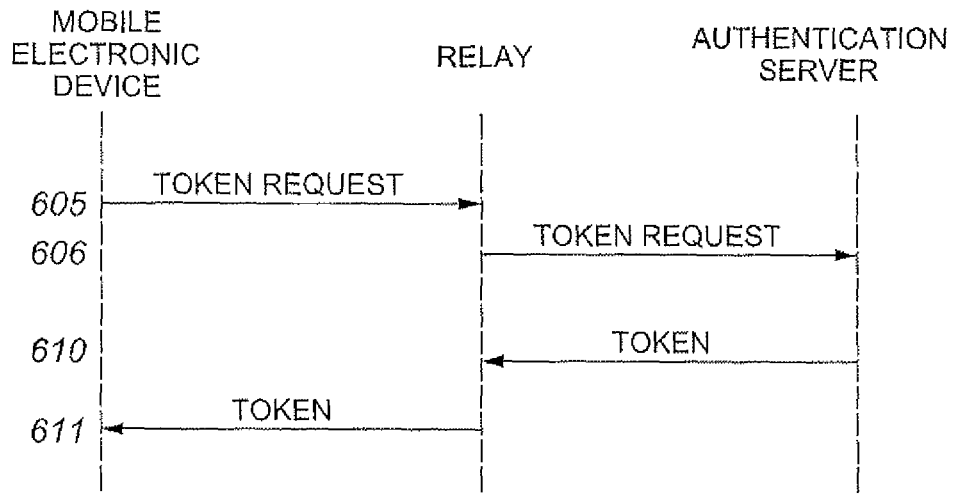
FIG. 5 is a diagram of a method in accordance with one example embodiment of the present disclosure.

Another exemplary embodiment is one or more computer readable medium having computer readable instructions stored thereon that when executed by a processor on a mobile electronic device cause the mobile electronic device to obtain proof of authorization to access a service provided from a service server. The method implemented by the processor in order to obtain the proof of authorization is shown in FIG. 5 and comprises outputting to a relay a request addressed to an authentication server for a token 605, 606, the token including an indication that the mobile electronic device is authorized to access the service; and receiving the token from the authentication server via the relay 610, 611.

In some embodiments of the one or more computer readable medium, the method further comprises encrypting the request using an encryption key shared with the authentication server.

Figure 6A:
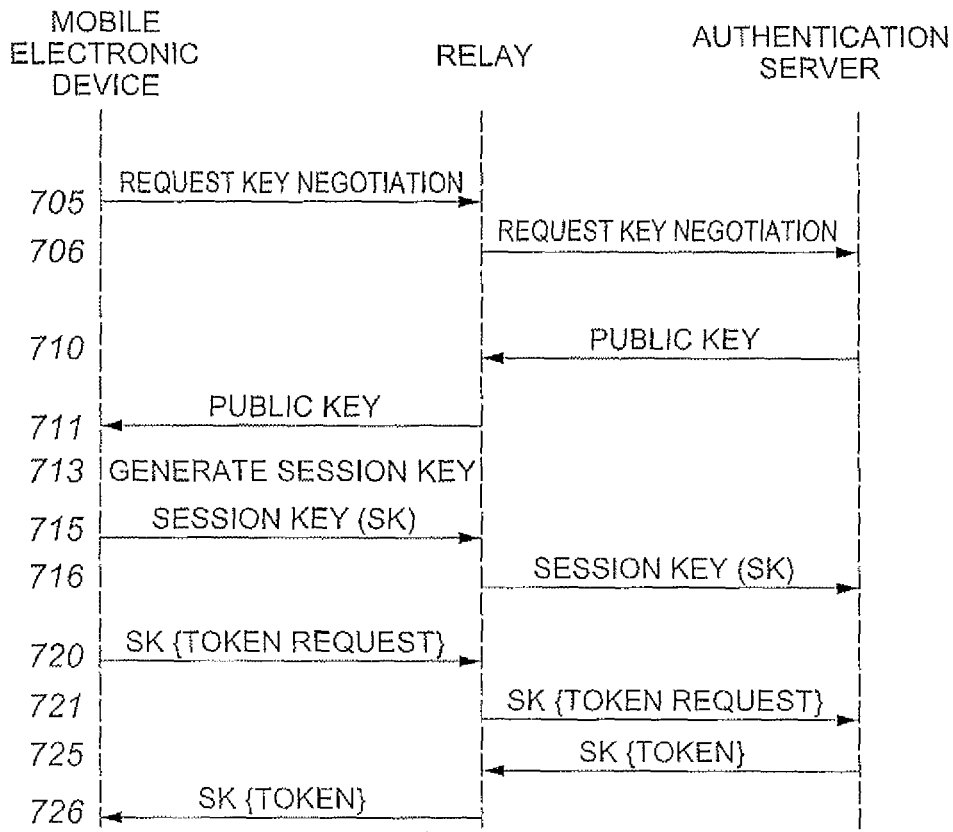
FIGS. 6A and 6B are diagrams of methods in accordance with one example embodiment of the present disclosure.

In a further embodiment of the one or more computer readable medium, as shown in FIG. 6A, the method further comprises: outputting to the relay a request to negotiate a session key from the authentication server 705, 706; receiving a public key from the authentication server through the relay 710, 711; generating the session key 713; transmitting the session key to the authentication server through the relay using the public key 715, 716; and using the session key to encrypt and decrypt communications with the authentication server through the relay for obtaining the token 720, 721, 725, 726. Actions 720, 721, 725 and 726 of FIG. 6A are the same as the actions described with reference to FIG. 5 for obtaining a token with the exception that the communications are encrypted using the session key.

Figure 6B:
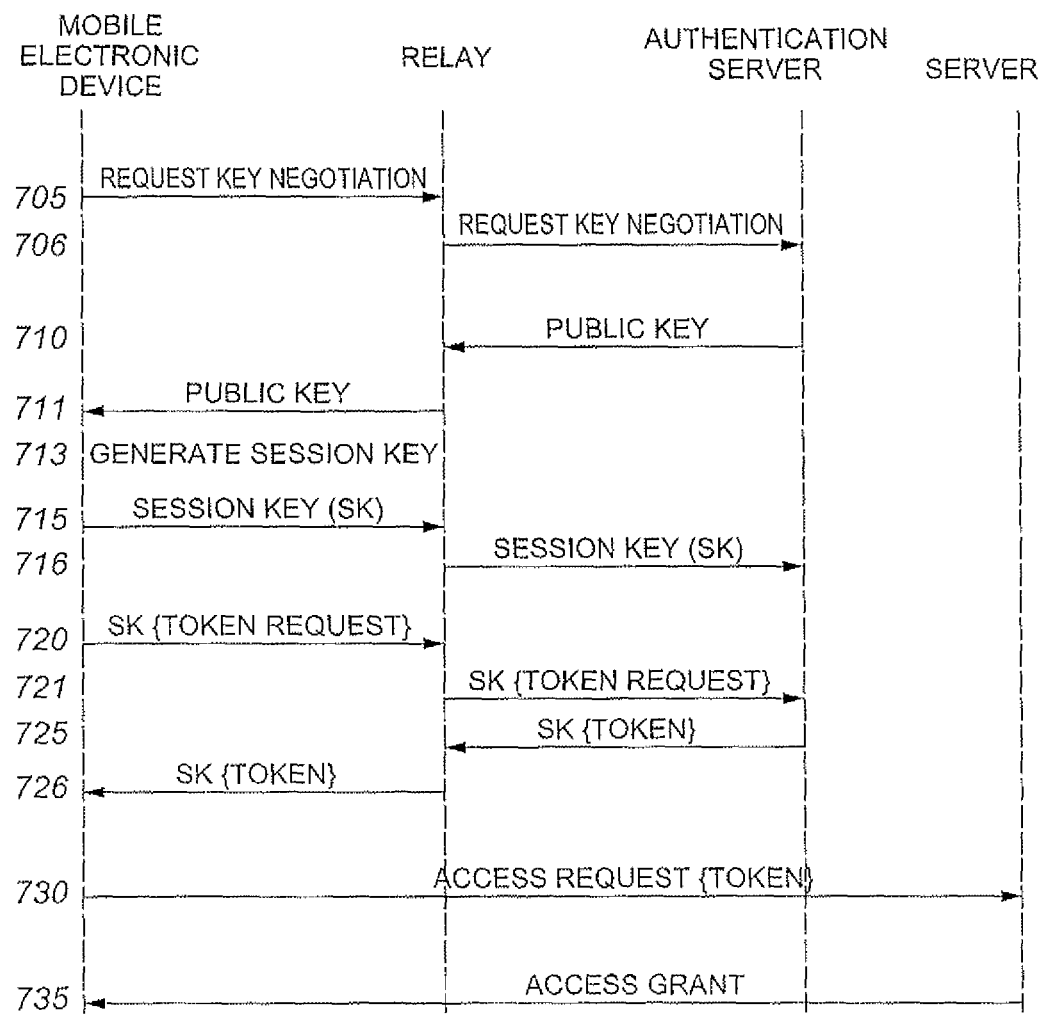

In a further exemplary embodiment of the one or more computer readable medium, as shown in FIG. 6B, the method further comprises accessing the service on the service server through a direct connection using the token as proof of authorization for the mobile electronic device to access the service 730. The method may further comprise receiving a message from the service server from which the service in provided indicating that access has been granted 735.

In some embodiments of the one or more computer readable medium, the method further comprises requesting a new token from the authentication server through the relay prior to an expiry of the token received.

Figure 7:
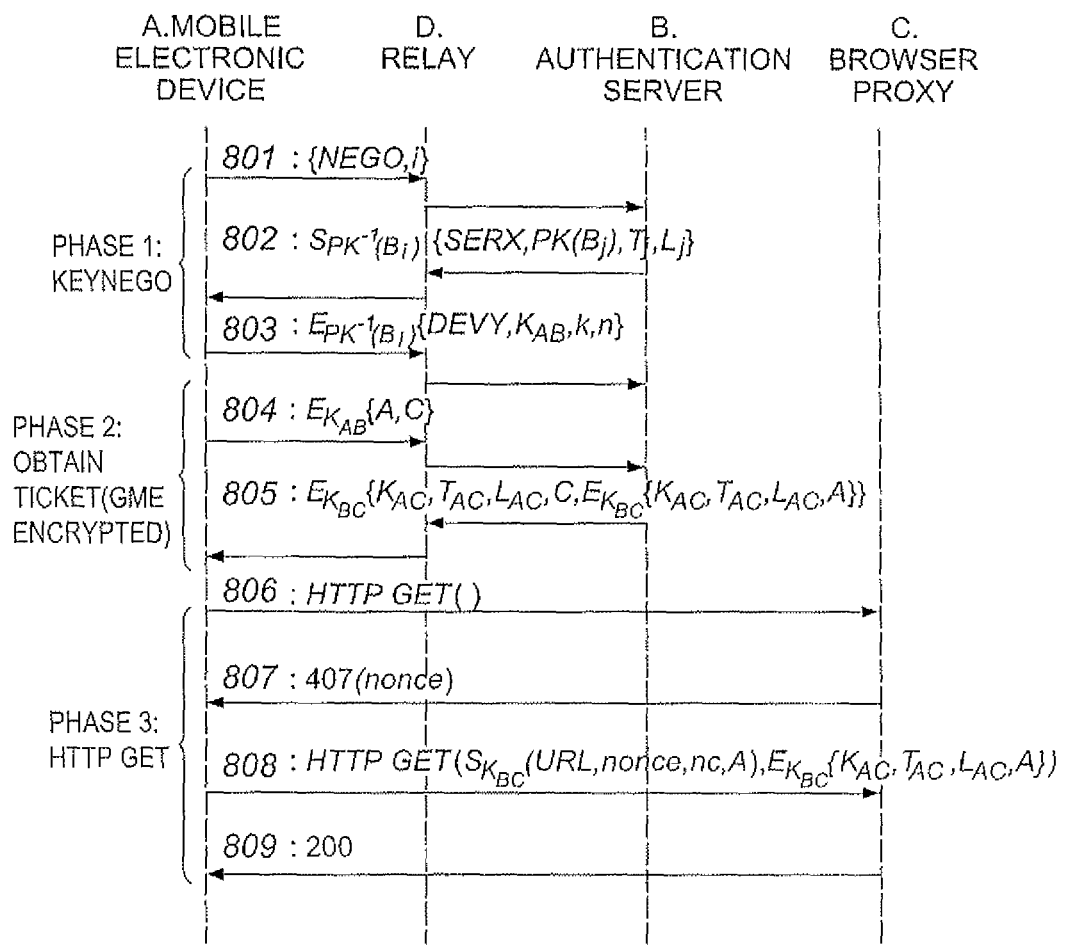
FIG. 7 is a diagram of a method in accordance with one example embodiment of the present disclosure.

FIG. 7 is a diagram of an authentication procedure in accordance with one embodiment. The procedure in this embodiment is broken up into three phases.

Phase 1

The first phase negotiates a session key between the mobile electronic device and the authentication server.

Action 801: Mobile electronic device sends the following to the authentication server through the relay:
"NEGO"—message type.
i—the index of the authentication server's long term public key known to the mobile electronic device.

Action 802: Authentication server sends to mobile electronic device through the relay:
"SERX"—message type.
PK ($B_j$)—a short-term public key of authentication server
$T_j$—the timestamp for the short-term public key of the authentication server
$L_j$—the lifetime for the short-term public key of the authentication server
All of the above are signed using the long term private key of the authentication server selected by the mobile electronic device, $PK^{-1}(B_i)$.

Action 803: Mobile electronic device sends to the authentication server through the relay:
"DEVY"—message type.
$K_{AB}$—a session key generated by the mobile electronic device for the purpose of encrypting subsequent communications between mobile electronic device and authentication server.
k—an index identifying the session key.
n—a nonce used to authenticate the mobile electronic device in the event the mobile electronic device wishes to negotiate a new session key.
All of the above are encrypted using the short-term public key of the authentication server $PK(B_j)$.

Phase 2

In phase 2, the mobile electronic device uses the Needham-Schroeder protocol, such as described in Roger Needham and Michael Schroeder, *Using encryption for authentication in large networks of computers*, Communications of the ACM, 21 (12), December 1978, as modified for Kerberos to obtain an authentication key and token from the authentication server that it can use to authenticate to the service server from which the service is provided, such as a browsing proxy.

Action 804: Mobile electronic device sends to the authentication server through the relay:
A—the device identifier
C—the identifier for the service server.
All of the above encrypted using the session key negotiated in phase 1, $K_{AB}$.

Action 805: Authentication server sends to the mobile electronic device through the relay:
$K_{AC}$—an authentication key that the mobile electronic device can use to authenticate itself to the service server. The authentication key is randomly generated by the authentication server and is unique to each token.
$T_{AC}$—the timestamp for the authentication key.
$L_{AC}$—the lifetime for the authentication key
C—the identifier of the service server.
$E_{K_{BC}} \{K_{AC}, T_{AC}, L_{AC}, A\}$—a token encrypted using an encryption key shared by the authentication server and the service server, $K_{BC}$. In this embodiment, the encryption key is the shared secret. The token contains the authentication key, timestamp, and lifetime, and the device identifier (PIN).
All of the above encrypted using the session key negotiated in phase 1, $K_{AB}$.

Phase 3

In phase 3, the mobile electronic device initiates a new session with the service server providing the service. In some embodiments, the service server providing the service is a browsing proxy and the session is a browser session. For a browser session, the operation of this phase is similar to HTTP proxy authentication using the digest authentication method, where the username is replace with the token and the password is the authentication key $K_{AB}$. Action 806: Mobile electronic device sends to the service server providing the service directly:
HTTP GET or POST request.

Action 807: Server sends to the mobile electronic device:
407 Proxy Authentication Required response.
nonce—a random nonce that serves as an authentication challenge.

Action 808: Mobile electronic device sends to the server providing service directly:
HTTP GET or POST request.
$S_{K_{AC}} \{URL, nonce, nc, A\}$—a digest of the URL nonce, nonce count, and device identifier computed using the authentication key, $K_{AC}$.
$R_{K_{BC}} \{K_{AC}, T_{AC}, L_{AC}, A\}$—the authentication token returned from the authentication server.
The payload of the HTTP GET or POST request, if any.

Action 809: server providing service decrypts the token to obtain the authentication key, $K_{AC}$, and verifies that the key is still valid by checking the timestamp and lifetime. It then uses the key to verify that the digest sent from the mobile electronic device is correct. If all checks pass, then the service server providing the service knows that the device identifier, A, is valid. Then the service server providing the service sends to the mobile electronic device:
200 OK response.

The embodiment of the protocol described above clearly separates phase 1 (session key negotiation) from phase 2 (token generation). In another embodiment of the protocol phase 1 overlaps with phase 2 by sending messages 803 and 804 together as a single message. When messages 803 and 804 are sent as a dingle message, the protocol described above requires two round-trip message exchanges between mobile electronic device and authentication server followed by two round-trip message exchanges between mobile electronic device and service server.

The protocols described herein rely on a relay, such as a communications relay, for the at least one of the following:

The relay authenticates the mobile electronic device. At message 804 of the protocol, the relay ensures that the source address of the message is the identifier of the mobile electronic device and that the mobile electronic device has been properly authenticated. The authentication server can verify that the device identifier carried in the message matches the source address.

The relay authorizes the mobile electronic device to connect to the browsing proxy. The authorization mechanism of the relay ensures that only devices for which public browsing service has been provisioned can communicate with the authentication servers on the relay. Therefore, only an authorized device can obtain a token to access the service server providing the service.

Since the token contains A (the device identifier) and the token is encrypted, the browsing proxy is able to determine the device identity while preventing any third-party from obtaining this information. This identity could be used for business intelligence purposes (subject to privacy requirements).

In some embodiments, after authentication token negotiation, the mobile electronic device stores the authentication token in a memory, such as RAM (random access memory) or flash memory. Authentication token contains the following information in encrypted form: $K_{AC}$, $T_{AC}$, $L_{AC}$, A.

In some embodiments, the mobile electronic device is configured to try to periodically refresh authentication token before the token expires. In an exemplary embodiment the heuristic is to refresh authentication token half way in its expiration period. For example, if the token validity period is 48 hours, the mobile electronic device will try to refresh the token 24 hours after token acquisition. To avoid bursts of token refresh requests, in some embodiments, a refresh schedule includes a random factor. For example, the token will be updated every 20±8 hours and the expiration time can be computed as 20+16R−8 where R is a random number in the range of [0, 1].

In some exemplary embodiments, additionally to the token refresh schedule, a new token is requested in at least one of the following events: HTTP 407 is received from a browsing proxy (except initial request with the token not specified); Battery pull or hard reset; and Device time change.

In some embodiments, all keys are generated using a cryptographically secure pseudo-random number generator (CSPRNG). In an exemplary embodiment, the initialization vectors also use CSPRNG to avoid predictable IV (Initialization Vector) attack on symmetric key.

In some embodiments, transaction IDs are used to prevent GME packet replay attack and to separate packets from different concurrent negotiations. Transaction IDs do not have to be sequential; they can be also generated using CSPRNG.

In some embodiments, before accepting incoming packet during token negotiation actions 801 to 804, the mobile electronic device and the authentication server should verify that the packets have expected transaction IDs.

In some embodiments, the authentication token is stored in a memory on the mobile electronic device memory unencrypted. Some embodiments of the mobile electronic device comprise a device key store for storing the authentication keys. In some embodiments, storing the token in the device key store requires a device user to enter a key store password every time a new attempt is made to access the service server providing the service, such as each time a TCP connection is opened by a browser, such as the browser module 282 on mobile electronic device 201 described with reference to FIG. 1. In some embodiments, the authentication token is stored in a memory such that it survives memory cleaning. In some embodiments where the token will be stored in the memory only, the token is renegotiated on device start-up.

In some embodiments, the authentication server long-term public key will be specified in an authentication token service book to be stored in a memory on the mobile electronic device. Once retrieved from the service book, the public key will be stored in persistent store. The public key will not be stored in the device key store to avoid key store password dialogs.

To ensure strong cryptography and keep computational complexity at a reasonable level on the service server side, some embodiments of the authentication server use ECDSA long-term public key with P521Fp curve. ECDSA with P521Fp has 256 bit symmetric strength.

To ensure strong cryptography and keep computational complexity at a reasonable level on the server side, some embodiments of the authentication server will use ECDH short-term public key with P521Fp curve. ECDH with P521Fp has 256 bit symmetric strength.

Because all communications between the mobile electronic device and the authentication server pass through a relay that ensures the mobile device is authorized to access the service and in some cases authenticates the mobile electronic device and in some further embodiments has cryptographic capabilities, the authentication server is not required to authenticate the mobile electronic device or to receive any identifying information about the device. The authentication server relies on the relay to perform those functions. In essence, if the request for a token makes it through the relay, then the authentication server trusts that it is a valid request and grants the token. The authentication server thus can act solely as a token granting device.

The methods described herein may be implemented using hardware, software, firmware or combinations thereof. It is to be understood that the actions of the methods are not limited to the order in which they are described are can be performed in any feasible order.

The various embodiments presented above are merely examples and are in no way meant to limit the scope of this disclosure. Variations of the innovations described herein will be apparent to persons of ordinary skill in the art, such variations being within the intended scope of the present application. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. An authentication server comprising:
   a receiver;
   a transmitter;
   a memory having stored thereon a secret shared with a service server from which a service is provided; and
   a hardware processor configured to:
   receive, at the receiver, a request from a mobile electronic device through a relay server to negotiate a session key, the relay server being separate from the authentication server and being a trusted entity not requiring authentication by the authentication server;
   negotiate the session key with the mobile electronic device through the relay server, wherein the session key is generated by the mobile device;
   while using the session key to encrypt and decrypt communications with the mobile electronic device through the relay server:
   generate a token in response to receipt, at the receiver, of a request from the relay server, the request originating from the mobile electronic device, the token being generated by the authentication server based on a reliance on the relay server to ensure that the mobile electronic device has authorization to access the service, the token being generated in absence of authentication of the mobile electronic device and the relay server by the authentication server when the request for the token is received; and
   cause the transmitter to transmit the token to the mobile electronic device through the relay server, the token being generated using the shared secret and the token including an indication that the mobile electronic device is authorized to access the service.

2. The authentication server of claim 1, wherein the processor is configured to generate the token based on a reliance on the relay server to authenticate the mobile electronic device.

3. The authentication server of claim 1, wherein the authentication server is connected to the relay server by a direct connection and the request is received over the direct connection and the token is transmitted over the direct connection.

4. The authentication server of claim 1, wherein the processor is further configured to verify that a device identifier carried in the request matches a source address of a message containing the request.

5. The authentication server of claim 1, wherein the processor is configured to generate the token authorizing the mobile electronic device to access a browsing proxy.

6. A method of issuing a token for use by a mobile electronic device for authorization to access a service provided from a service server, the method comprising:
   receiving a request, by an authentication server, from the mobile electronic device through a relay server to negotiate a session key, the relay server being separate from the authentication server and being a trusted entity not requiring authentication by the authentication server;
   negotiate the session key with the mobile electronic device through the relay server, wherein the session key is generated by the mobile electronic device;
   while using the session key to encrypt and decrypt communications between the authentication server and the mobile electronic device through the relay server:
   receiving, at the authentication server, a request for the token from the mobile electronic device through the relay server;
   generating the token, by the authentication server, based on a reliance on the relay server to ensure that the mobile electronic device is authorized to access the service, the token being generated in absence of authentication of the mobile electronic device and the relay server by the authentication server when the request for the token is received; and
   transmitting the token to the mobile electronic device through the relay server, the token being generated using a secret shared between the authentication server and the service server and the token including an indication that the mobile electronic device is authorized to access the service.

7. The method of claim 6, wherein generating the token is further based on a reliance on the relay server to authenticate the mobile electronic device.

8. The method of claim 6, further comprising verifying that a device identifier carried in the request matches a source address of a message containing the request.

9. The method of claim 6, further comprising obtaining a device identifier for the mobile electronic device from the request and including the device identifier in the token.

10. The method of claim 6, wherein generating the token comprises generating a token for accessing a browsing proxy.

11. One or more non-transitory computer readable medium having computer readable instructions stored thereon that when executed by a processor on a mobile electronic device cause the mobile electronic device to obtain proof of authorization to access a service provided from a service server by a method comprising:
   outputting, to an authentication server through a relay server, a request to negotiate a session key with the authentication server, the relay server being separate from the authentication server and being a trusted entity not requiring authentication by the authentication server;
   negotiating the session key with the authentication server through the relay server, wherein the session key is generated by the mobile electronic device;
   while using the session key to encrypt and decrypt communications with the authentication server through the relay server:
   outputting, to the relay server, a request addressed to the authentication server for a token to be used as indication that the mobile electronic device is authorized to access the service; and
   receiving the token from the authentication server via the relay server, in absence of authentication of the mobile electronic device by the authentication server;
   wherein the token is generated by the authentication server, based on a reliance on the relay server to ensure that the mobile electronic device is authorized to access the service, the token being generated in absence of authentication of the relay server by the authentication server when the request for the token is received at the authentication server; and
   the token being generated using a secret shared between the authentication server and the service server.

12. The one or more computer readable medium of claim 11, wherein negotiating the session key comprises:
   receiving a public key from the authentication server through the relay server;
   generating the session key; and
   transmitting the session key to the authentication server through the relay server using the public key.

13. The one or more computer readable medium of claim 11, wherein the method further comprises accessing the service through a direct connection using the token as proof of authorization for the mobile electronic device to access the service.

14. The one or more computer readable medium of claim 11, wherein the method further comprises requesting a new token from the authentication server through the relay server prior to an expiry of the token received.

15. The one or more computer readable medium of claim 11, wherein the token is for accessing a browsing proxy.

* * * * *